United States Patent
Blaszczyk et al.

(10) Patent No.: US 8,512,902 B2
(45) Date of Patent: Aug. 20, 2013

(54) SYSTEM AND METHOD OF PURGING FUEL CELL STACKS

(75) Inventors: Janusz Blaszczyk, Richmond (CA); Peter J. Bach, Vancouver (CA); Michael J. Procter, North Vancouver (CA); Michael P. Sexsmith, North Vancouver (CA)

(73) Assignees: Daimler AG, Stuttgart (DE); Ford Motor Company, Dearborn, MI (US)

(*) Notice: Subject to any disclaimer, the term of this patent is extended or adjusted under 35 U.S.C. 154(b) by 1164 days.

(21) Appl. No.: 11/931,874

(22) Filed: Oct. 31, 2007

(65) Prior Publication Data
US 2008/0213635 A1 Sep. 4, 2008

Related U.S. Application Data

(60) Provisional application No. 60/864,722, filed on Nov. 7, 2006.

(51) Int. Cl.
*H01M 8/00* (2006.01)

(52) U.S. Cl.
USPC ........................................ 429/429; 429/408

(58) Field of Classification Search
USPC ................. 429/429, 431, 442, 513, 90, 408, 429/428, 512
See application file for complete search history.

(56) References Cited

U.S. PATENT DOCUMENTS

| | | | |
|---|---|---|---|
| 6,093,502 A | 7/2000 | Carlstrom, Jr. et al. | |
| 6,124,054 A | 9/2000 | Gorman et al. | |
| 6,242,120 B1 | 6/2001 | Herron | |
| 6,455,185 B2 | 9/2002 | Bircann et al. | |
| 6,783,879 B2 * | 8/2004 | Skala et al. | 429/420 |
| 6,887,605 B2 | 5/2005 | Herron | |
| 6,960,401 B2 | 11/2005 | Barton et al. | |
| 2002/0022161 A1 | 2/2002 | Kurosaki et al. | |
| 2002/0182456 A1 * | 12/2002 | Condit et al. | 429/13 |
| 2004/0013919 A1 | 1/2004 | Ueda et al. | |
| 2004/0137285 A1 | 7/2004 | Meltser | |
| 2004/0209133 A1 | 10/2004 | Hirsch et al. | |
| 2004/0241512 A1 | 12/2004 | Muto et al. | |
| 2004/0265658 A1 | 12/2004 | de Vaal et al. | |

(Continued)

FOREIGN PATENT DOCUMENTS

| | | |
|---|---|---|
| EP | 1 473 789 A2 | 11/2004 |
| GB | 2 401 986 A | 11/2004 |

(Continued)

OTHER PUBLICATIONS

International Search Report dated Dec. 8, 2008 (Seven (7) pages).

(Continued)

*Primary Examiner* — Mark F Huff
*Assistant Examiner* — Monique Wills
(74) *Attorney, Agent, or Firm* — Stephan A. Pendorf; Patent Central LLC

(57) ABSTRACT

A fuel cell stack comprising a fuel inlet and an oxidant inlet for allowing the supply of a fuel and an oxidant to the fuel cell stack, respectively, and a fuel outlet and an oxidant outlet for allowing the removal of an anode exhaust and a cathode exhaust from the fuel cell stack, respectively, wherein the fuel outlet is fluidly connected to a high frequency purge valve.

14 Claims, 1 Drawing Sheet

(56) References Cited

U.S. PATENT DOCUMENTS

| | | |
|---|---|---|
| 2005/0118469 A1 | 6/2005 | Leach et al. |
| 2005/0164050 A1 | 7/2005 | Reiser |
| 2005/0244686 A1 | 11/2005 | Kamihara |
| 2005/0260463 A1 | 11/2005 | Chapman et al. |
| 2006/0003204 A1 | 1/2006 | Callahan et al. |
| 2006/0051632 A1 | 3/2006 | Kamihara |
| 2006/0051635 A1 | 3/2006 | Kamihara |
| 2006/0073363 A1* | 4/2006 | Taniguchi et al. ............... 429/12 |
| 2006/0105224 A1 | 5/2006 | Schwarz et al. |
| 2006/0134478 A1 | 6/2006 | Fuse |

FOREIGN PATENT DOCUMENTS

| | | |
|---|---|---|
| GB | 2 403 588 A | 1/2005 |
| WO | WO 02/37588 A1 | 5/2002 |
| WO | WO 03/010841 A2 | 2/2003 |
| WO | WO 03/010845 A2 | 2/2003 |
| WO | WO 2004/105169 A1 | 12/2004 |
| WO | WO 2005/076393 A2 | 8/2005 |
| WO | WO 2007/102612 A1 | 9/2007 |

OTHER PUBLICATIONS

PCT/ISA/237 (Seven (7) pages), Oct. 31, 2007.

* cited by examiner

SYSTEM AND METHOD OF PURGING FUEL CELL STACKS

CROSS-REFERENCE TO RELATED APPLICATION

This application claims the benefit under 35 U.S.C. §119 (e) of U.S. Provisional Patent Application No. 60/864,722 filed Nov. 7, 2006, which is incorporated herein by reference in its entirety.

BACKGROUND

1. Technical Field

The present invention relates to fuel cell systems comprising fuel cell stacks, and methods of operating fuel cell stacks and, in particular, to methods of purging fuel cell stacks.

2. Description of the Related Art

Electrochemical fuel cells convert reactants to generate electric power and reaction products. Electrochemical fuel cells generally employ an electrolyte, such as an ion-exchange membrane, interposed between two electrodes, namely a cathode and an anode, to form an electrode assembly. The electrode assembly is typically interposed between two electrically conductive flow field plates or separators that act as current collectors, provide support for the electrodes, and provide passages for the reactants and products. Such separators typically comprise flow fields to supply reactants, such as fuel and oxidant, to the anode and the cathode, respectively, and to remove excess reactants and reaction products, such as water formed during fuel cell operation. Typically, a number of fuel cells are connected in series to form a fuel cell stack.

However, when air is used as the oxidant, nitrogen tends to crossover from the cathodes (and cathode flow fields) through the ion-exchange membrane to the anodes (and anode flow fields) during operation. As fuel is consumed in the fuel cell, the concentration of nitrogen in the anode flow fields increases, thus accumulating therein and negatively impacting the performance of the fuel cell stack.

In some methods of operation, fuel is recirculated in the anodes of the fuel cell stack by means of a recirculation device, such as a pump, compressor, blower, or fan, such that a portion of the exhausted fuel (or anode exhaust) is recirculated from the fuel outlet of the fuel cell stack to the fuel inlet of the fuel cell stack through an anode recirculation loop while a remainder portion is purged periodically, discussed in further detail below. The portion of exhausted fuel that is recirculated then mixes with fresh fuel from the fuel supply so that the mixed fuel entering the fuel cell stack is at least partially humidified without the need of a humidifier. In this case, nitrogen that crosses over from the cathodes through the ion-exchange membrane to the anodes during operation will also accumulate in the recirculation loop and negatively impacts the performance of the fuel cell stack and the efficiency of the recirculating device. In addition, contaminants from the fuel source can also build up in the anode flow fields (and/or anode recirculation loop) as fuel is consumed. As a result, most fuel cell systems contain a purge valve or purge assembly for purging excess nitrogen and other contaminants from the anode flow fields and/or recirculation loop. The purge valve is typically a solenoid purge valve, such as two-way (open-close) solenoid valve.

The anode flow fields are typically purged at predetermined time intervals. However, conventional purging methods often result in large pressure fluctuations in the anode flow fields (and/or anode recirculation loop) with each purge because the pressure builds up in the anode flow fields (and/or anode recirculation loop) when the purge valve is closed and then the pressure suddenly drops when the purge valve is opened. In addition, most two-way solenoid purge valves are sized so that they can adequately purge the largest required volume in a predicted range of operating conditions of the fuel cell stack (i.e., purge volumes that are required at high loads). However, at low loads, these purge valves are larger than required and, thus, purge more of the anode exhaust than necessary, again decreasing fuel efficiency.

As a result, there remains a need to develop improved methods of purging impurity gases from fuel cell stacks. The present invention addresses these issues and provides further related advantages.

BRIEF SUMMARY

Briefly, the present invention relates to a fuel cell stack comprising a high frequency purge valve for purging at least a portion of the anode exhaust, and a method of operating such a fuel cell stack.

According to one embodiment of the present invention, the fuel cell stack comprises a fuel inlet and an oxidant inlet for supplying a fuel and an oxidant to the fuel cell stack, respectively, and a fuel outlet and an oxidant outlet for removing an anode exhaust and a cathode exhaust from the fuel cell stack, respectively, wherein the fuel outlet is fluidly connected to a high frequency purge valve.

In another embodiment, the present invention relates to a method of operating a fuel cell stack comprising a fuel inlet and an oxidant inlet for supplying a fuel and an oxidant to the fuel cell stack, respectively, and a fuel outlet and an oxidant outlet for removing an anode exhaust and a cathode exhaust from the fuel cell stack, respectively, wherein the fuel outlet is fluidly connected to a purge valve, the method comprising the steps of: providing fuel and oxidant to the fuel cell stack; drawing a load from the fuel cell stack; and actuating the purge valve at a high frequency to purge at least a portion of the anode exhaust.

These and other aspects of the invention will be evident upon review of the following disclosure and attached figures.

BRIEF DESCRIPTION OF THE DRAWINGS

In the figures, identical reference numbers identify similar elements or acts. The sizes and relative positions of elements in the figures are not necessarily drawn to scale. For example, the shapes of various elements and angles are not drawn to scale, and some of these elements are arbitrarily enlarged and positioned to improve figure legibility. Further, the particular shapes of the elements, as drawn, are not intended to convey any information regarding the actual shape of the particular elements, and have been solely selected for ease of recognition in the figures.

DETAILED DESCRIPTION

In the following description, certain specific details are set forth in order to provide a thorough understanding of various embodiments of the invention. However, one skilled in the art will understand that the invention may be practiced without these details. In other instances, well-known structures associated with fuel cells, fuel cell stacks, and fuel cell systems have not been shown or described in detail to avoid unnecessarily obscuring descriptions of the embodiments of the invention.

Unless the context requires otherwise, throughout the specification and claims which follow, the word "comprise" and variations thereof, such as "comprises" and "comprising" are to be construed in an open, inclusive sense, that is as "including but not limited to".

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The present invention is generally related to fuel cell stacks and systems, and to methods of operating fuel cell stacks and systems, in particular, methods of purging fuel cell stacks. These fuel cell stacks and systems may be used for various applications, including, but not limited to, automotive applications, stationary power applications, portable power applications, and backup power applications.

Figure 1:
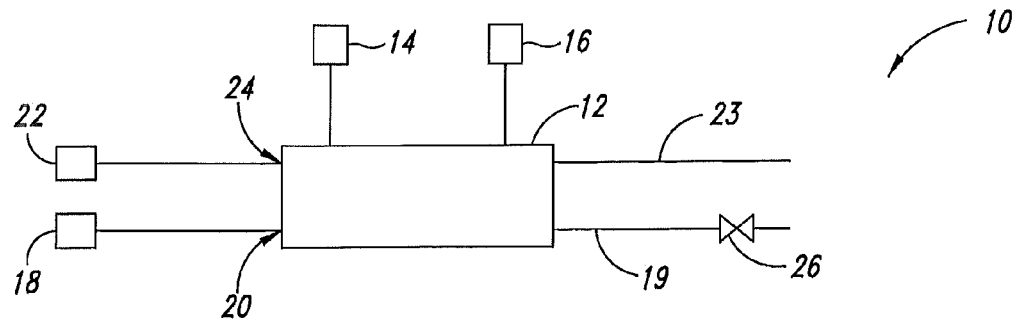
FIG. 1 is a schematic of an exemplary fuel cell system according to an embodiment of the present invention.

FIG. 1 shows a schematic of an exemplary fuel cell system 10 comprising a fuel cell stack 12, a detection device 14 for detecting an operational characteristic of fuel cell stack 12, and a controller 16 for controlling the various components in fuel cell system 10. During operation (i.e., when load is drawn) fuel, such as pure hydrogen or a hydrogen-containing fluid, is supplied from fuel source 18 to fuel inlet 20 of fuel cell stack 12; oxidant, such as air, is supplied from oxidant source 22 to oxidant inlet 24 of fuel cell stack 12; and spent fuel and spent oxidant exit fuel cell stack 12 via anode exhaust 19 and cathode exhaust 23, respectively. Fuel cell system 10 further comprises a high frequency pulse-width modulated (PWM) purge valve 26 that is periodically opened to purge the anode exhaust 19, which typically comprises inerts, water, contaminants and excess fuel. This mode of operation, also known as dead-ended operation, minimizes the amount of excess fuel that is purged from the fuel cell stack because the purge parameters may be selected such that substantially all of the hydrogen fuel is consumed, leaving mainly inerts, water and contaminants to be purged out of the fuel cell stack.

To purge the fuel cell stack, PWM purge valve 26 is actuated such that it is open for an open time interval and closed for a close time interval at a high frequency, for example, greater than 10 Hz. One example of a suitable PWM purge valve that may be employed is the Clean Air Power (San Diego, Calif.) fuel injector SP051. The purge parameters, such as the open time interval, the closed time interval, the ratio of the open time interval to the closed time interval (hereinafter referred to as "the open-close interval ratio"), and/or the frequency will depend on the fuel cell system architecture and operating conditions, and is chosen such that the PWM purge valve produces very short, quick purges to ensure that the desired amount of anode exhaust is removed. In some embodiments, the frequency of the purges may be equal to or greater than 10 Hz, for example, equal to or greater than about 30 Hz, generally equal to or greater than about 60 Hz, and typically equal to or greater than about 100 Hz. In other embodiments, the open-close interval ratio may range from 2%:98% (for idle or low loads) to 98%:2% (for high loads) for any given frequency.

The purge parameters may be chosen to reduce, as much as possible, the amount of hydrogen that is also purged, thereby increasing fuel efficiency. In some applications, this may also help prevent the hydrogen concentration at the outlet of the fuel cell stack and/or fuel cell system from reaching the flammability limit, particularly if the anode exhaust is purged into the ambient environment. In further embodiments, the fuel cell system may further comprise a diluter, catalytic combustor, recombiner, or the like (not shown) into which at least a portion of the anode exhaust and/or the cathode exhaust is purged. This also prevents hydrogen from being released into the ambient air, which is particularly useful for applications where hydrogen emission standards are stringent.

In further embodiments, the purge parameters may be determined by controller 16 based on any detectable operational characteristic of one or more fuel cells in the fuel cell stack detected by detector 14. Suitable operational characteristics include the voltage, load drawn, power output, and/or resistance of a single fuel cell, a group of fuel cells, or the fuel cell stack. For example, the detected operational characteristic may be the stack load. If the stack load is less than a first predetermined load value and the amount of fuel supplied is lower, the open-close interval ratio may be decreased at a given frequency to purge a smaller amount of the anode exhaust because there is likely less nitrogen crossover and less contaminants. However, if the load is equal to or greater than the first predetermined load value, the amount of fuel supplied is greater and, thus, the open-close interval ratio may be increased for a given frequency to purge a greater amount of the anode exhaust because there is likely a greater amount of nitrogen cross-over and more contaminants. In other embodiments, more than one detectable operational characteristic of the fuel cell stack may be used to determine one or more of the open time interval, the closed time interval, the open-close interval ratio, and/or the frequency.

Figure 2:
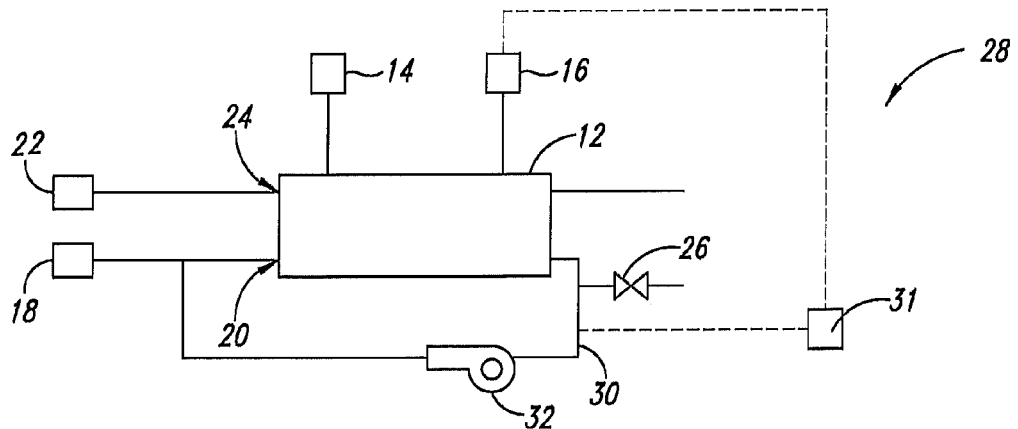
FIG. 2 is a schematic of an exemplary fuel cell system with a recirculation loop according to another embodiment of the present invention.
Figure 3:
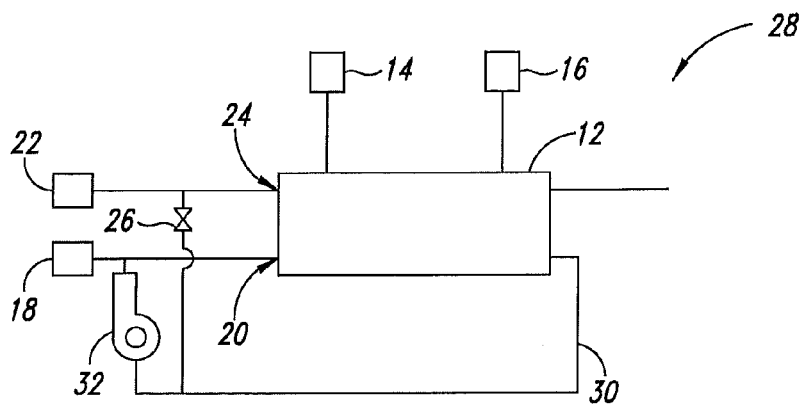
FIG. 3 is a schematic of an exemplary fuel cell system with a recirculation loop according to a further embodiment of the invention.

FIG. 2 shows a schematic of another exemplary fuel cell system 28 which contains a recirculation loop 30 for recirculating at least a portion of the anode exhaust to fuel inlet 20. In some embodiments, fuel cell system 28 may also contain a recirculation device 32 to assist in recirculating at least a portion of the anode exhaust. Such recirculation devices may be, for example, a blower, a compressor, a jet pump, or the like that can recirculate at least a portion of the anode exhaust. In other embodiments, at least a portion of the anode exhaust is purged into oxidant inlet 24 from anode recirculation loop 30 and PWM purge valve 26, such as the fuel cell system configuration shown in FIG. 3. This allows any excess hydrogen that has been purged from anode recirculation loop 30 to be consumed in the cathodes of fuel cell stack 12, thus further reducing the amount of hydrogen being released into ambient air and reducing or eliminating the need for a diluter, catalytic combustor, or recombiner at the outlet of the fuel cell stack or fuel cell system.

In some embodiments, fuel cell system 28 may further comprise a hydrogen sensor 31 for detecting a hydrogen concentration in anode recirculation loop 30. The hydrogen sensor may be in communication with controller 16 to control one or more of the purge parameters. For example, if the hydrogen concentration in anode recirculation loop 30 is less than a first predetermined hydrogen concentration value, the open-close interval ratio may be increased for a given frequency to purge a greater amount of the anode exhaust so that less anode exhaust is recirculated back to fuel inlet 20. Conversely, if the hydrogen concentration in anode recirculation loop 30 is equal to or greater than the first predetermined hydrogen concentration value, the open-close interval ratio may be decreased for a given frequency to purge a smaller amount of the anode exhaust so that a greater amount of the anode exhaust is recirculated back to fuel inlet 20.

Additionally, or alternatively, the oxidant flow rate may be used to determine one or more of the purge parameters. For example, the oxidant flow rate may be controlled by one or more of the purge parameters to ensure that the hydrogen concentration of the anode exhaust mixed with ambient air and/or the cathode exhaust is below the flammability limit. In another example, in the situation where at least a portion of the anode exhaust is purged into the oxidant inlet, the detected hydrogen concentration in the anode recirculation loop and the oxidant flow rate may be used in combination to determine one or more of the purge parameters such that when incoming oxidant from oxidant source 24 is mixed with the anode exhaust coming from PWM purge valve 26, the hydrogen concentration therein does not exceed the flammability limit.

In any of the above embodiments, mathematical models and/or lookup tables may be stored in controller 16 and used to predict the impurity accumulation rate based on at least one operational characteristic of the fuel cell stack, including, but not limited to, the load drawn from the fuel cell stack, the voltage of at least one fuel cell in the fuel cell stack, the power output of the fuel cell stack, the amount of fuel supplied to the fuel cell stack, the amount of oxidant supplied to the fuel cell stack, and/or combinations thereof. The predicted impurity accumulation rate is then used to control one or more of the purge parameters to purge a sufficient portion of the anode exhaust and to maintain the desired hydrogen concentration in the mixed fuel that is supplied to the fuel cell stack.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

While particular elements, embodiments, and applications of the present invention have been shown and described, it will be understood that the invention is not limited thereto since modifications may be made by those skilled in the art without departing from the spirit and scope of the present disclosure, particularly in light of the foregoing teachings.

What is claimed is:

1. A fuel cell system, comprising:
   a fuel cell stack,
   a fuel inlet and an oxidant inlet,
   a fuel outlet and an oxidant outlet for removing an anode exhaust and a cathode exhaust from the fuel cell stack, respectively,
   a conduit for communicating between an oxygen source and the oxygen inlet and a conduit for communicating between a fuel source and the fuel inlet,
   wherein the fuel outlet is fluidly connected to a high frequency pulse-width modulated (PWM) purge valve, wherein the purge valve is configured to open for purges at a frequency of equal to or greater than 10 Hz, and wherein the ratio of the open time interval to the closed time interval ranges from 2%:98% to 98%:2% for any given frequency,
   a detector for detecting at least one operational characteristic of at least one fuel cell in the fuel cell stack, and
   a controller for controlling at least one operating parameter of the high frequency purge valve based on an input from the detector relating to the at least one detected operational characteristic.

2. The fuel cell system of claim 1 wherein the high frequency purge valve is operable to actuate at a frequency of at least 60 Hz.

3. The fuel cell system of claim 1 wherein the high frequency purge valve is operable to actuate at a frequency of at least 100 Hz.

4. The fuel cell system of claim 1 wherein the at least one operational characteristic is selected from the group consisting of a voltage, applied load, power output, and resistance of one or more fuel cells in the fuel cell stack.

5. The fuel cell system of claim 1 wherein the at least one operational characteristic is selected from the group consisting of a hydrogen concentration of the anode exhaust and an oxidant flow rate.

6. The fuel cell system of claim 1 wherein the at least one operating parameter of the purge valve is selected from the group consisting of a frequency, an open time interval, a close time interval, and an open-close interval ratio.

7. A method of operating a fuel cell system having a fuel cell stack, an anode side and a cathode side and comprising a fuel inlet and an oxidant inlet for supplying a fuel and an oxidant to the fuel cell stack, respectively, a fuel outlet and an oxidant outlet for removing an anode exhaust and a cathode exhaust from the fuel cell stack, respectively, wherein an oxidant source is fluidly coupled via a conduit to the oxygen inlet, and wherein a high frequency pulse-width modulated (PWM) purge valve is fluidly connected on one side to the fuel outlet, the method comprising the steps of:
   providing the fuel and oxidant to the fuel cell stack;
   drawing a load from the fuel cell stack;
   detecting at least one operational characteristic of at least one fuel cell in the fuel cell stack during operation,
   determining at least one operating parameter of the purge valve based on the at least one operating parameter, and
   operating a controller for controlling at least one operating parameter of the high frequency pulse-width modulated purge valve based on an input from the detector relating to the at least one detected operational characteristic, wherein the pulse-width modulated purge valve is actuated at a frequency of equal to or greater than 10 Hz, and wherein the ratio of the open time interval to the closed time interval ranges from 2%:98% to 98%:2% for any given frequency.

8. The method of claim 7 wherein actuating the purge valve comprises the steps of opening the purge valve for an open time interval and closing the purge valve for a close time interval.

9. The method of claim 7 wherein the detected at least one operational characteristic of the fuel cell stack is selected from the group consisting of a voltage, load drawn, power output, and resistance of one or more fuel cells in the stack.

10. The method of claim 7 wherein the detected at least one operational characteristic of the fuel cell stack is selected from the group consisting of a hydrogen concentration of the anode exhaust and an oxidant flow rate.

11. The method of claim 7 wherein the frequency of opening and closing the purge valve is at least 60 Hz.

12. The method of claim 7 wherein the frequency of opening and closing the purge valve is at least 100 Hz.

13. The method of claim 7 wherein the fuel cell stack is fluidly connected to an anode recirculation loop, the anode recirculation loop fluidly connecting the fuel outlet to the fuel inlet of the fuel cell stack, the method further comprising the step of recirculating at least a portion of the anode exhaust from the fuel outlet to the fuel inlet.

14. The fuel cell system of claim 1 wherein the fuel cell stack is fluidly connected to an anode recirculation loop, the anode recirculation loop fluidly connecting the fuel cell stack fuel outlet to the of the fuel cell stack fuel inlet.

* * * * *